United States Patent
Chouanard et al.

(10) Patent No.: US 8,850,056 B2
(45) Date of Patent: Sep. 30, 2014

(54) METHOD AND SYSTEM FOR MANAGING CLIENT-SERVER AFFINITY

(75) Inventors: Jean Chouanard, Redwood City, CA (US); Swee B. Lim, Cupertino, CA (US); Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1872 days.

(21) Appl. No.: 11/209,291

(22) Filed: Aug. 22, 2005

(65) Prior Publication Data

US 2007/0043842 A1    Feb. 22, 2007

(51) Int. Cl.
*G06F 15/173* (2006.01)
*G06F 15/16* (2006.01)
*H04L 29/08* (2006.01)
*H04L 29/06* (2006.01)

(52) U.S. Cl.
CPC ........ *H04L 67/1008* (2013.01); *H04L 67/1002* (2013.01); *H04L 67/1021* (2013.01); *H04L 67/1034* (2013.01); *H04L 67/1027* (2013.01); *H04L 63/166* (2013.01)
USPC .......................................... 709/232; 709/223

(58) Field of Classification Search
USPC .................................................. 709/232, 223
See application file for complete search history.

(56) References Cited

U.S. PATENT DOCUMENTS

| | | | |
|---|---|---|---|
| 6,195,682 B1 * | 2/2001 | Ho et al. ........................ | 709/203 |
| 6,389,469 B1 * | 5/2002 | Vekslar et al. ................. | 709/226 |
| 6,587,866 B1 * | 7/2003 | Modi et al. ..................... | 718/105 |
| 6,611,872 B1 * | 8/2003 | McCanne ....................... | 709/238 |
| 6,735,206 B1 | 5/2004 | Oki et al. | |
| 6,813,635 B1 * | 11/2004 | Jorgenson ...................... | 709/225 |
| 6,983,317 B1 * | 1/2006 | Bishop et al. .................. | 709/223 |
| 7,017,049 B2 * | 3/2006 | Hand et al. ....................... | 726/22 |
| 7,051,066 B1 * | 5/2006 | Albert et al. ................... | 709/202 |
| 7,200,665 B2 * | 4/2007 | Eshghi et al. .................. | 709/227 |
| 7,203,764 B2 * | 4/2007 | Jorgenson ...................... | 709/238 |
| 7,209,977 B2 | 4/2007 | Acharya et al. | |
| 2002/0116474 A1 | 8/2002 | Copeland et al. | |
| 2002/0143965 A1 | 10/2002 | Aiken, Jr. | |
| 2002/0152403 A1 * | 10/2002 | Hand et al. ..................... | 713/201 |
| 2003/0046379 A1 * | 3/2003 | Nakamura et al. ............. | 709/223 |
| 2004/0078782 A1 | 4/2004 | Clement et al. | |
| 2005/0021594 A1 * | 1/2005 | Bernardin et al. ............. | 709/200 |
| 2005/0050202 A1 | 3/2005 | Aiken et al. | |

OTHER PUBLICATIONS

U.S. Appl. No. 11/209,306, filed Aug. 22, 2005.
U.S. Appl. No. 11/209,305, filed Aug. 22, 2005.
U.S. Appl. No. 11/209,293, filed Aug. 22, 2005.
U.S. Appl. No. 11/209,290, filed Aug. 22, 2005.
U.S. Appl. No. 11/209,291, filed Aug. 22, 2005.

* cited by examiner

*Primary Examiner* — Ario Etienne
*Assistant Examiner* — Blake Rubin
(74) *Attorney, Agent, or Firm* — Robert C. Kowert; Meyertons, Hood, Kivlin, Kowert & Goetzel, P.C.

(57) ABSTRACT

In a computer communication network, affinity between a client and server is established dynamically. The client desiring affinity sends a request to establish affinity to an available server. The server can then respond by sending the client a redirect to an elected server, with which the client already has affinity. If there is no such elected server, the server establishes affinity between itself and the client.

39 Claims, 8 Drawing Sheets

METHOD AND SYSTEM FOR MANAGING CLIENT-SERVER AFFINITY

TECHNICAL FIELD OF THE INVENTION

Embodiments of the present invention relate to computer communication networks. More particularly, specific embodiments of the present invention relate to the management of client-server affinity.

BACKGROUND

The present invention relates to computer communication networks, and more particularly to networks having clients and servers. In such a network, a server is typically a process that has access to some resource, such as a database, shared files, printers, or the Internet. A client is typically a process that can contact the server to request access to the resource. For instance, a client can send a message to a server requesting information from the resource. The server then retrieves that information from the resource, performs any necessary processing, and transmits it to the client. The server can also facilitate transfers of information from the client to the resource by accepting information from the client and sending it to the resource. The client, server, and resource(s) may, but need not, be hosted on physically separate platforms.

A communication network as described above can include a number of servers and a number of clients. To request access to a resource, a particular client may be able to contact any of several servers, any or all of which may provide access to that resource.

Often, when a client accesses the resource through a particular server, the server will store state information relating to the client's connection to the particular server. In this case, having the same client contact a second server for a subsequent request may be undesirable because the second server would not have stored the same state information. In some cases, the lack of state information may affect the second server's ability to process or comply with the client's request.

For instance, if the client establishes a secure communication session with a first server, the first server may store a key required for decoding encrypted messages from the client. If the client then contacted a second server, the second server would not have the same key stored, and thus would not be able to decrypt the client's messages. Since only the first server would be able to decrypt the client's encrypted messages, the client should contact only the first server for subsequent requests, at least while the encryption arrangement is still valid.

The idea that a client should direct subsequent requests to the same server, as described above, is the notion of affinity between a client and server. When affinity has been established between a client and server, the server is then known as the client's elected server. Establishing affinity may require storing affinity information so that the client can determine which server to contact for its subsequent requests. This affinity information can include any information relating to the affinity relationship, such as the identity of the elected server, and can be stored in many locations, such as in a file system or an HTTP cookie.

Methods for managing affinity currently known in the art include schemes in which the affinity relationship exists only for the duration of a session, where a session is a lasting connection between a client and a server, which can consist of the exchange of a number of packets. For instance, a client and server may negotiate a session key when establishing an encrypted SSL session, concurrently establishing affinity between the client and server. Thereafter, the client avoids connecting with another server while the session key is valid because doing so would require a costly and unnecessary renegotiation of a second session key. When the original session key and associated affinity expires, which may happen after a predetermined time period, the client is then free to contact another server because renegotiation of a new session key is no longer unnecessary.

Aside from the expiration of a session, affinity relationships can also be broken by such events as client reset, failure of a communication link between the client and elected server, or failure of the elected server, among others.

There is need in the art for a method for managing affinity that provides for the restoration of a previously established affinity when the client has for some reason lost its affinity information while the elected server is still willing to act as an elected server. Such a method would be valuable because it would enable clients to reestablish affinity without loss of state information and would further avoid costly recreation of state information.

Current methods for managing affinity can also often result in sub-optimal load balancing across servers. For instance, an affinity scheme may cause all requests from a particular IP address to be directed towards a particular server. However, a group of clients using port address translation may all appear to have the same IP address. In this case, assigning affinity based on IP address can result in an exceptionally high load on a particular server because that server may be assigned to handle traffic from an IP address that has associated with it requests from a group of clients, rather than just one client. Because methods for managing affinity currently known in the art can result in such unbalanced loading of servers, the art can benefit from an affinity managing scheme that effectively balances the load across servers.

SUMMARY

One embodiment of the present invention in a computer communication network is a method for establishing affinity between a client and a server. The method includes accepting a request from a client to establish affinity, then checking for an existing affinity relationship between the requesting client and an elected server. The method further includes establishing new affinity with the client when no affinity relationship exists between that client and an elected server, or sending the client a redirect to the elected server when an affinity relationship does exist between the client and an elected server.

An embodiment of the present method may also include, among others, actions such as checking a backend registry to determine if affinity already exists, storing affinity information in the backend registry when creating a new affinity, returning affinity information to the client, and moving queued messages from a previously elected server to a new elected server when new affinity is established.

DETAILED DESCRIPTION

Figure 1:
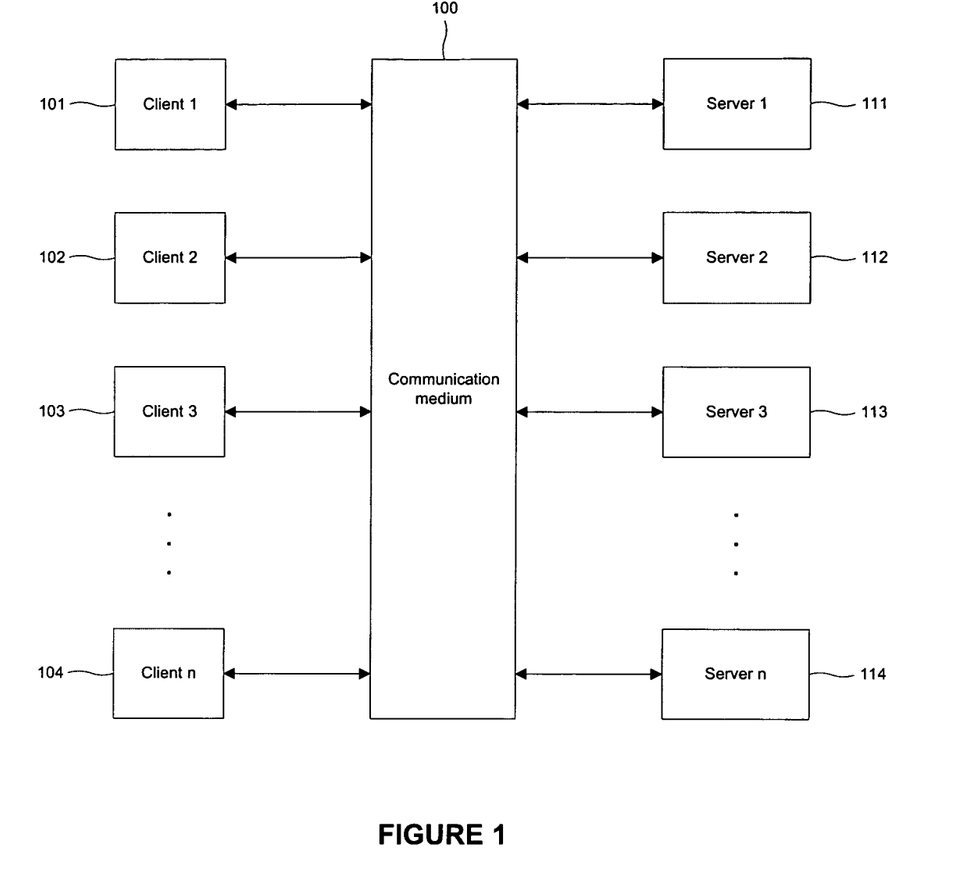
FIG. 1 shows an example of a computer communication network having a number of clients and a number of servers.

FIG. 1 shows a block diagram representation of a computer communication system to which the invention may be applied. The system may include a number of clients 101-104, which are configured to request information from a number of servers 111-114 by sending messages through a communication medium 100. In addition to being configured to request information from servers, clients can also be configured to accept responses from servers and send information to servers.

Servers 111-114 may have access to some resource to which a client needs access. Such a resource can be a file system, another network, printers, cameras, etc. A server connected to the resource may be configured to respond to a client's request for information from that resource by retrieving information from the resource and sending it to the client. A server may also be configured to accept information from a client and send it to the resource for storing or other processing.

Communication medium 100 may be any form of such medium including conventional computer networks or networks of networks, direct or indirect connections, and may use one or more forms of physical media such as Ethernet cables, optical cables, radio frequency signals, or any other medium or combination of media that can be used to transmit signals. The communication medium may connect all clients to all servers, so that any client can contact any server, or it may only connect some clients to some servers, while connecting other clients to other servers. The communication medium may in some instances be configured to only allow communications in one direction. For example, the medium may only allow messages to be transmitted from client to server. Other embodiments may only allow communications from server to client, or may allow communications in both directions.

Clients and servers may further be configured to use an affinity scheme in which a client contacts a specific server for repeated requests or other transactions. Such a relationship between a client and a server is known as affinity. The server with which a client has affinity is known as the client's elected server. To maintain affinity with its elected server, a client typically stores information that identifies the elected server (e.g., the elected server's IP address), which allows the client to re-contact the elected server.

A client may lose its affinity information for many reasons, including reinstallation of software, data corruption, or a client shutdown and restart. A client may also sever the affinity relationship if its elected server fails to respond because the elected server is inoperative, overloaded or unreachable for some other reason. At times, affinity relationships may also need to be changed for other reasons.

Figure 2:
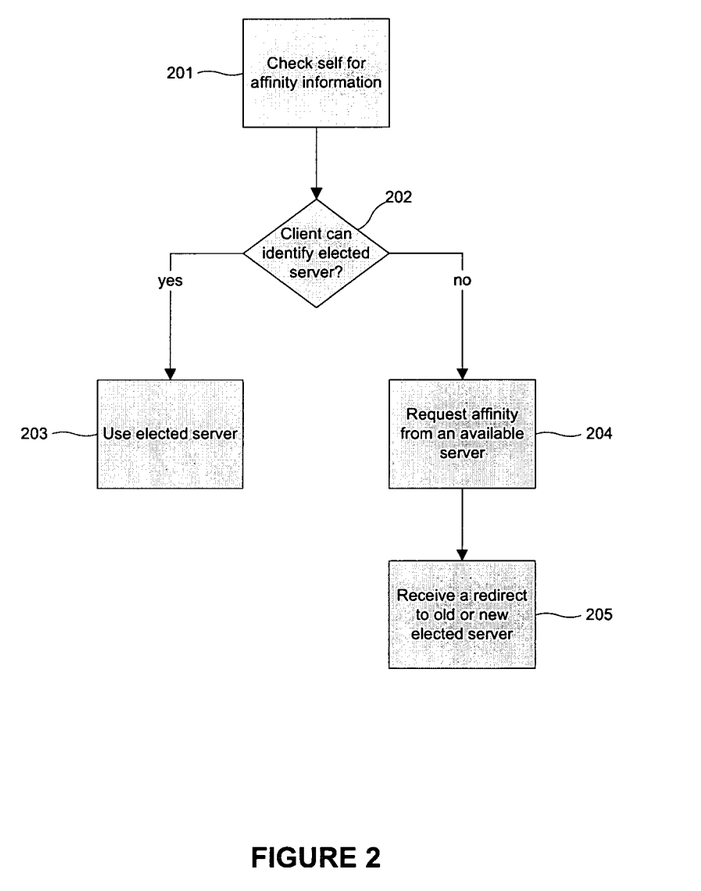
FIG. 2 is a flowchart illustrating a process by which a client requests affinity from a server in accordance with one embodiment of the present invention.

FIG. 2 is a flow chart illustrating a process by which a client identifies its elected server in accordance with an exemplary embodiment of the invention. In step 201, the client may check itself for affinity information that identifies the elected server. The client may do this by reading its own internal memory, for example. In step 202, if sufficient information is found to enable the client to identify the elected server, the client can simply use that information to contact the elected server it identified, as shown in step 203. If the client cannot identify its elected server in step 202, the client sends a message to an available server requesting affinity (step 204). The client may choose this server to contact at random or based on some criteria such as load, availability, location, history of previous contact, etc. The client then waits for either a message redirecting the client to its elected server or affinity information establishing the contacted server as the client's new elected server (step 205).

Figure 3:
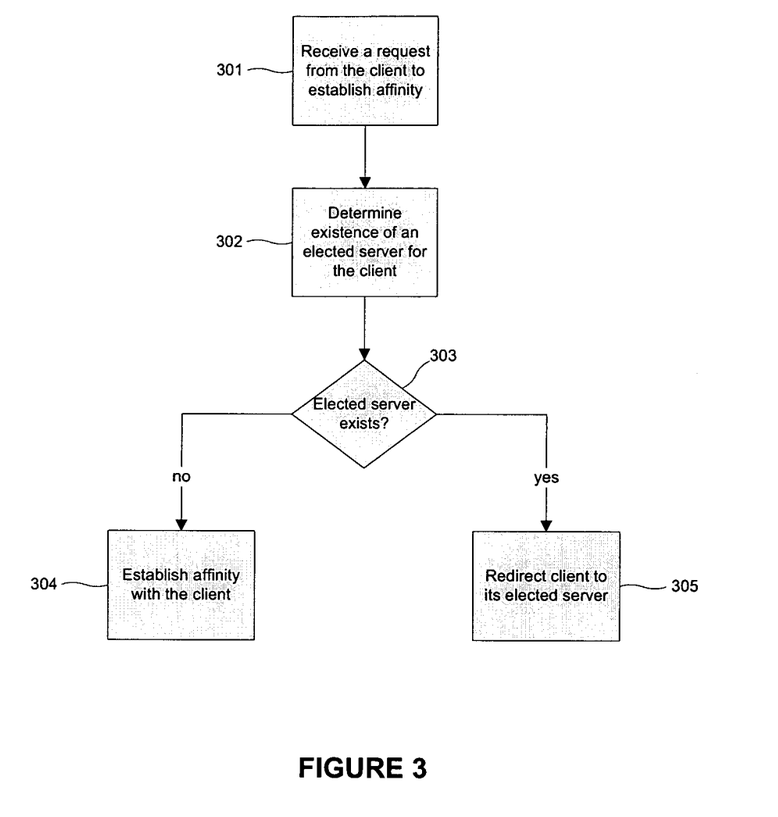
FIG. 3 is a flowchart illustrating a process by which a server responds to a client's request to establish affinity in accordance with one embodiment of the present invention.

Continuing the above example, when a server receives a request from a client to establish affinity, as sent by the client in step 204, the server proceeds as illustrated in FIG. 3. The server first receives the request to establish affinity in step 301, then determines if the requesting client already has a designated elected server (step 302). If the client already has an elected server (see decision box 303), the server redirects the client to its elected server in step 305. Otherwise, the server will establish affinity between itself and the requesting client in step 304 and will itself become the client's elected server.

Figure 4:
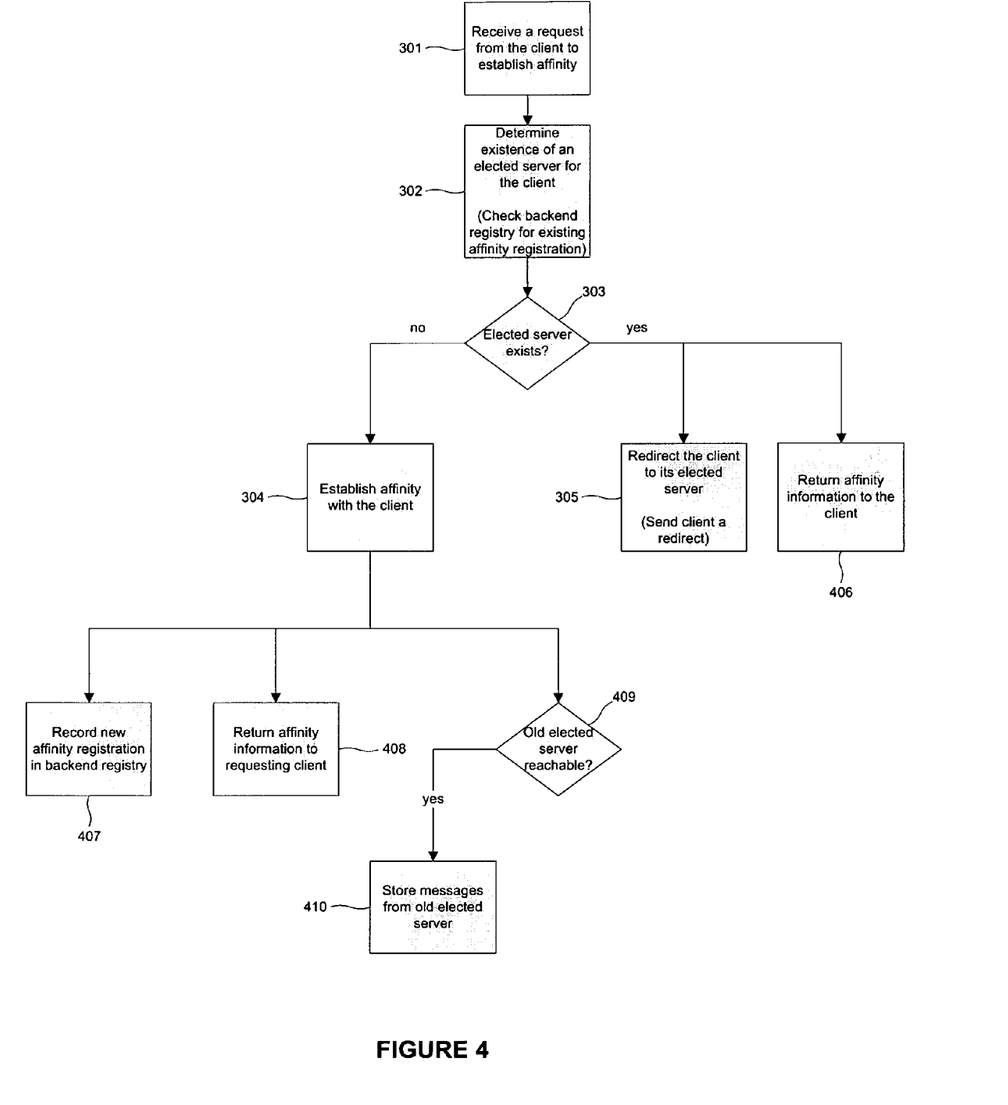
FIG. 4 is a flowchart describing the process by which a server responds to a client's request to establish affinity, including further actions that may be executed in the process in accordance with one embodiment of the present invention.

FIG. 4 illustrates in further detail one example of how the process shown in FIG. 3 may be implemented. As before, the server first receives the client's request to establish affinity in step 301. In step 302, the server then determines whether or not an elected server for the client already exists.

In this particular embodiment, step 302 includes checking a backend registry for an affinity registration describing an affinity relationship between the requesting client and its elected server. The backend registry may be a memory area (e.g., accessible by one or more servers) that can be used to store affinity information. This affinity information, when residing in the backend registry, can be organized in data structures known as affinity registrations. A server performing step 302 can determine the existence or nonexistence of a requesting client's elected server by finding or failing to find, respectively, an affinity registration corresponding to the requesting client.

If the server, at step 303, determines that an elected server exists for the requesting client, the server then redirects the client to its elected server. In the illustrated embodiment, this may include sending the client a redirect, which is a message instructing the client to contact its elected server, and which contains enough information to allow the client to do so (e.g., the IP address of the client's elected server). The server can also return other affinity information (e.g., session keys, etc.) to the client, as shown in step 406.

If the server, at step 303, determines that an elected server does not already exist for the requesting client, or if such a previously elected server does exist but for various reasons cannot be reached, (e.g., network failure, hardware failure, etc.) or cannot otherwise be used by the client, the server proceeds to establish an affinity relationship between itself and the requesting client, as shown in step 304. As part of this process, the server records a new affinity registration in the backend registry describing the new affinity relationship between the server and the requesting client (step 407). The server can also return affinity information to the requesting client, as shown in step 408.

After creating a new affinity relationship between itself and the requesting client, the server may contact the client's old elected server (if one existed, and if it is reachable, step 409) to retrieve queued messages intended for receipt by the requesting client (step 410). Recall that one embodiment of the invention applies to a computer communication system where the communication medium 100 only allows messages to be transmitted from client to server. In such a system, messages destined for the client may be queued at the elected server until they are actively retrieved by the client or otherwise removed. These messages can be stored in a data structure known as a mailbox. Upon establishing a new affinity relationship with the requesting client, the new elected server may first determine if the client's old elected server is reachable, at step 409. If the old elected server is reachable, the new elected server can then retrieve and store the queued messages, as shown in step 410, so that the client can retrieve these messages from the new elected server.

Figure 5:
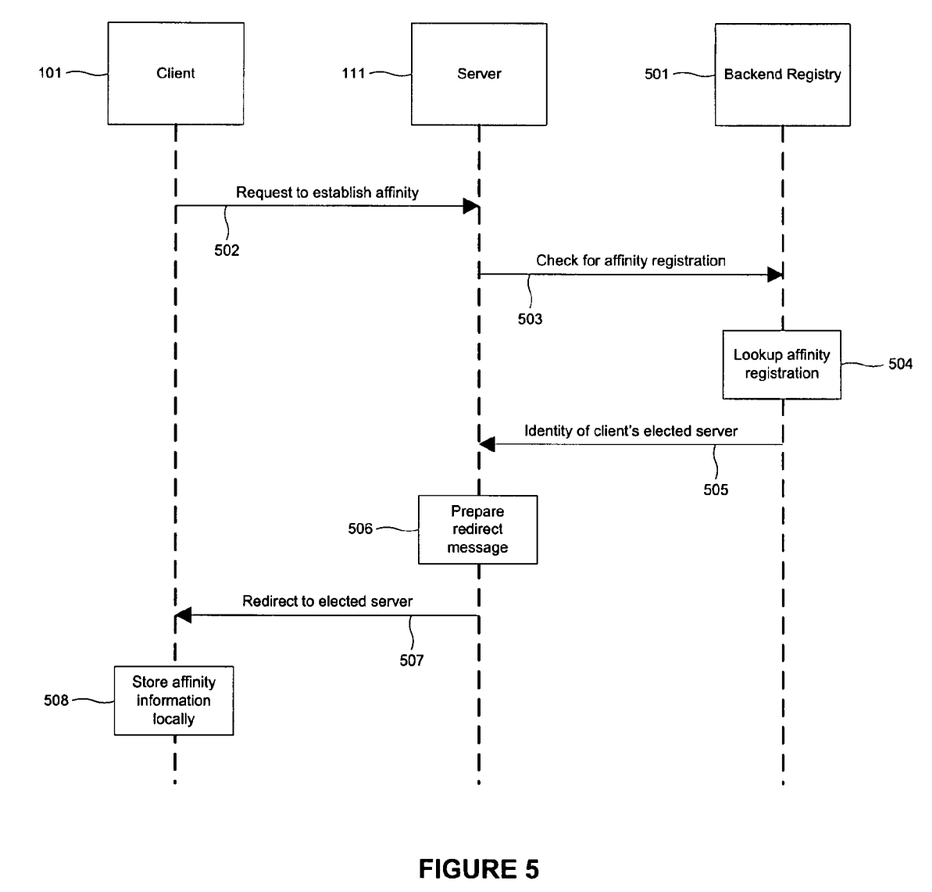
FIG. 5 is a messaging diagram illustrating an exchange of messages between and actions taken by entities in a computer communication network when a client requests to establish affinity when affinity already exists between that client and an elected server in accordance with one embodiment of the present invention.
Figure 6:
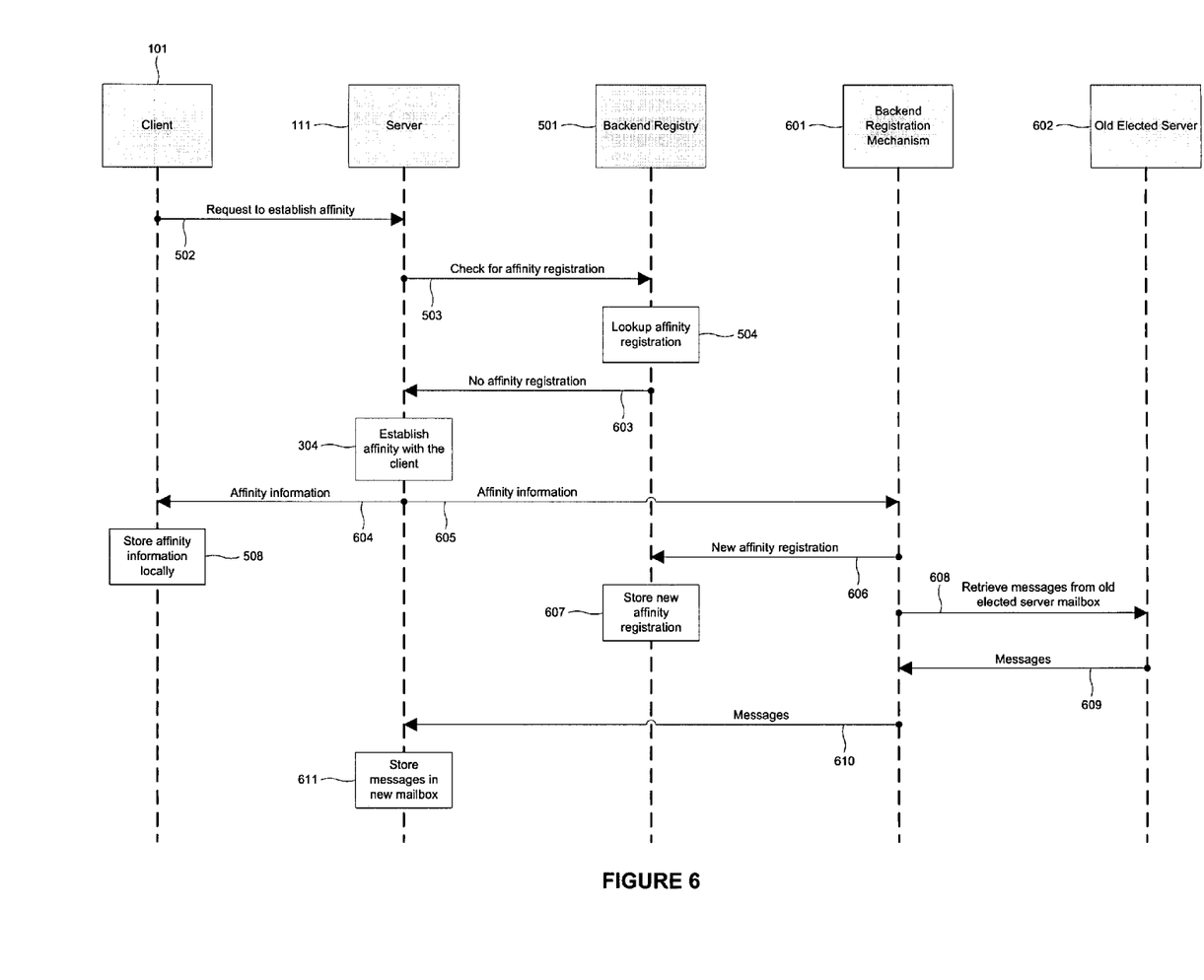
FIG. 6 is a messaging diagram illustrating an exchange of messages between and actions taken by entities in a computer communication network when a client requests to establish affinity when affinity does not exist between that client and an elected server in accordance with one embodiment of the present invention.

The messaging diagrams of FIGS. 5 and 6 also illustrate processes by which a server may respond to a request from a client to establish affinity.

FIG. 5 describes the case in which a client 101 requests affinity from a server 111 when that client already has an elected server. In this case, the client 101 first sends a request to establish affinity 502 to the server 111. Upon receiving request 502, the server 111 then contacts the backend registry 501 to check for an affinity registration that describes an affinity relationship between the client 101 and its elected server, if any. The server may accomplish this by sending a message 503 requesting the backend registry to look up and return the required affinity information. The backend registry 501, upon receiving such a message 503, can then attempt to look up an affinity registration for client 101, as shown in step 504. When pertinent affinity information, such as the identity of client 101's elected server, has been found in the backend registry, a transmission 505 can be sent to the server 111 containing this information. When the server 111 receives this information, it can then prepare a redirect message, as shown in step 506. The server then sends the redirect message 507 to the client 101, which stores the received affinity information in its local memory, as shown in step 508.

FIG. 6 describes the case in which a client 101 requests affinity from a server 111 when that client does not have an elected server. Messages are sent and steps proceed as in FIG. 5 until step 504, where an affinity registration describing an affinity relationship between client 101 and its elected server is sought in the backend registry. In this case, no affinity registration is found. A message 603 is sent to the server 111 to notify the server that no affinity registration was found for the client 101. The server 111 can then proceed to establish affinity with the client 101 in step 304. Having established affinity within itself, server 111 can then transmit affinity information 604 to the client 101, which will store the affinity information 604 in local memory in step 508.

The server 111 can also send affinity information 605 to the backend registration mechanism 601 to allow the backend registration mechanism to record a new affinity registration 606 in the backend registry 501. The backend registry then stores the new affinity registration in memory at step 607.

The backend registration mechanism 601 can also operate to move messages from an old elected server 602 to the new elected server 111. The backend registration mechanism 601 sends a transmission 608 requesting the messages from the old elected server. The messages 609, 610 are then transferred via the backend registration mechanism 601 to the server 111. The server 111 then stores the messages in local memory at step 611.

Figure 7:
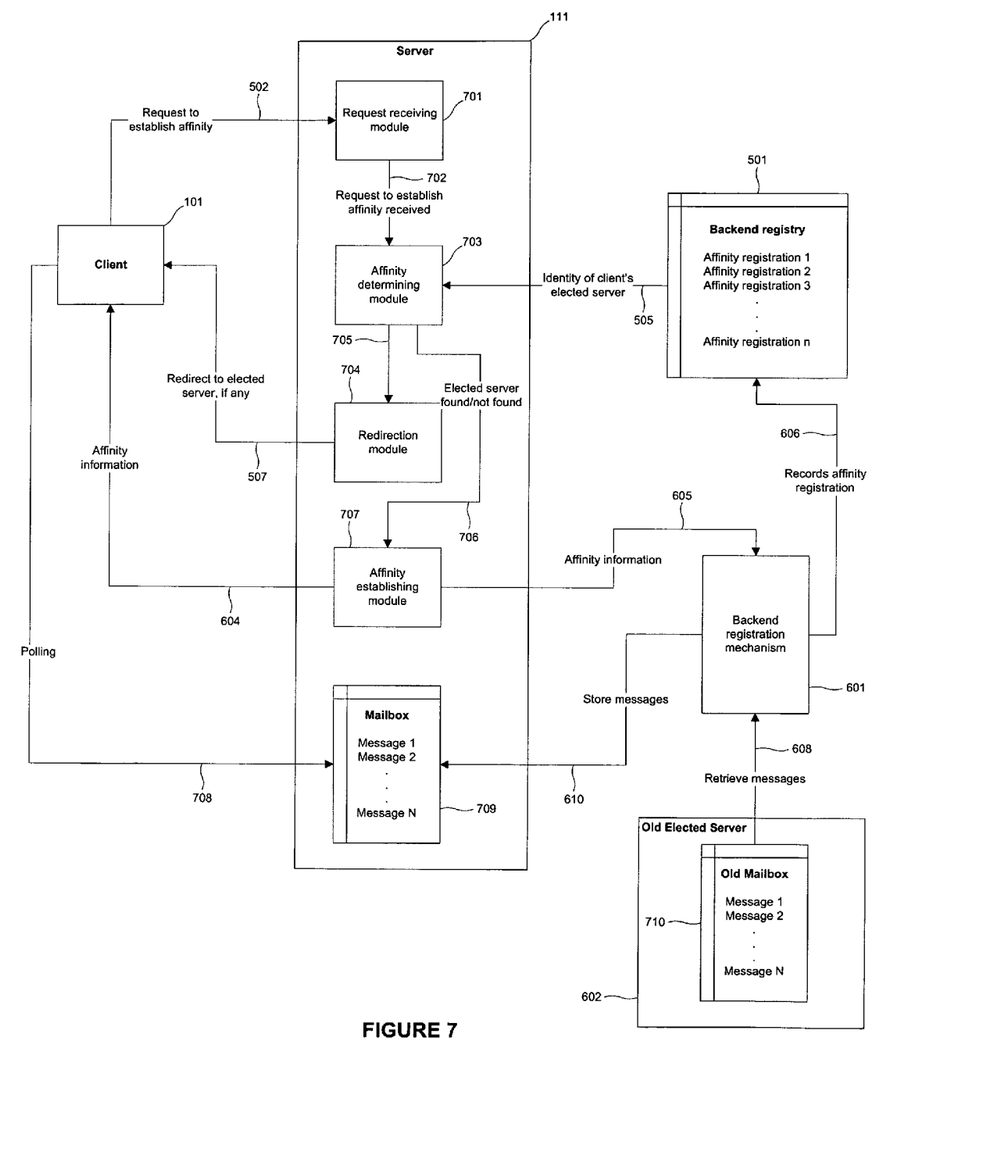
FIG. 7 is a block diagram showing information flow between entities of a computer communication network in accordance with one embodiment of the present invention.

FIG. 7 describes the flow of information between different entities within a computer communication network implementing an exemplary embodiment of the present invention. In this embodiment, the client 101 is enabled to send a request to establish affinity 502, receive a redirect to an elected server 507, and receive affinity information 604. The client 101 can also poll a mailbox 709 on its elected server 111 to check for messages intended for receipt by the client 101 which have been queued in the mailbox 709.

Server 111 includes five modules: the request receiving module 701, the affinity determining module 703, the redirection module 704, the affinity establishing module 707, and the mailbox 709.

The request receiving module 701 receives a request to establish affinity 502 from client 101. Once the request to establish affinity 502 has been received, the request receiving module 701 also sends a notification 702 to the affinity determining module 703 that a request to establish affinity has been received.

Affinity determining module 703 is configured to request and receive the identity of a client's elected server from the backend registry 501 upon receipt of a notification 702 that a request to establish affinity was received. In other embodiments, the affinity determining module 703 may request the identity of the client's elected server from the backend registration mechanism 601, which will then look up the information in the backend registry 501. Upon receiving the identity of the client's elected server 505, the affinity determining module 703 sends a notification 705 to the redirection module 704 if the elected server was found, or a notification 706 to the affinity establishing module 707 if the elected server was not found. This notification 706 can also contain information identifying the client's elected server.

The redirection module 704 is configured to prepare and transmit a redirect 507 to client 101 when the redirection module 704 has received a notification 705 that the client's elected server was found. The redirect message 507 redirects client 101 to the client's elected server.

The affinity establishing module 707 is configured to establish affinity at the server 111 when it receives a notification 706 that the client's elected server was not found in the backend registry 501. The affinity establishing module can also send affinity information 604 to the client or affinity information 605 to the backend registration mechanism 601.

Affinity information 605 may be used by the backend registration mechanism 601 to construct an affinity registration 606 to be stored in the backend registry 501. The backend registration mechanism 601 may also be configured to retrieve messages 608 from the mailbox 710 of client 101's old elected server 602. Having retrieved messages 608, the backend registration mechanism 601 could then store the messages 610 in the mailbox 709 of the client's new elected server 111.

Figure 8:
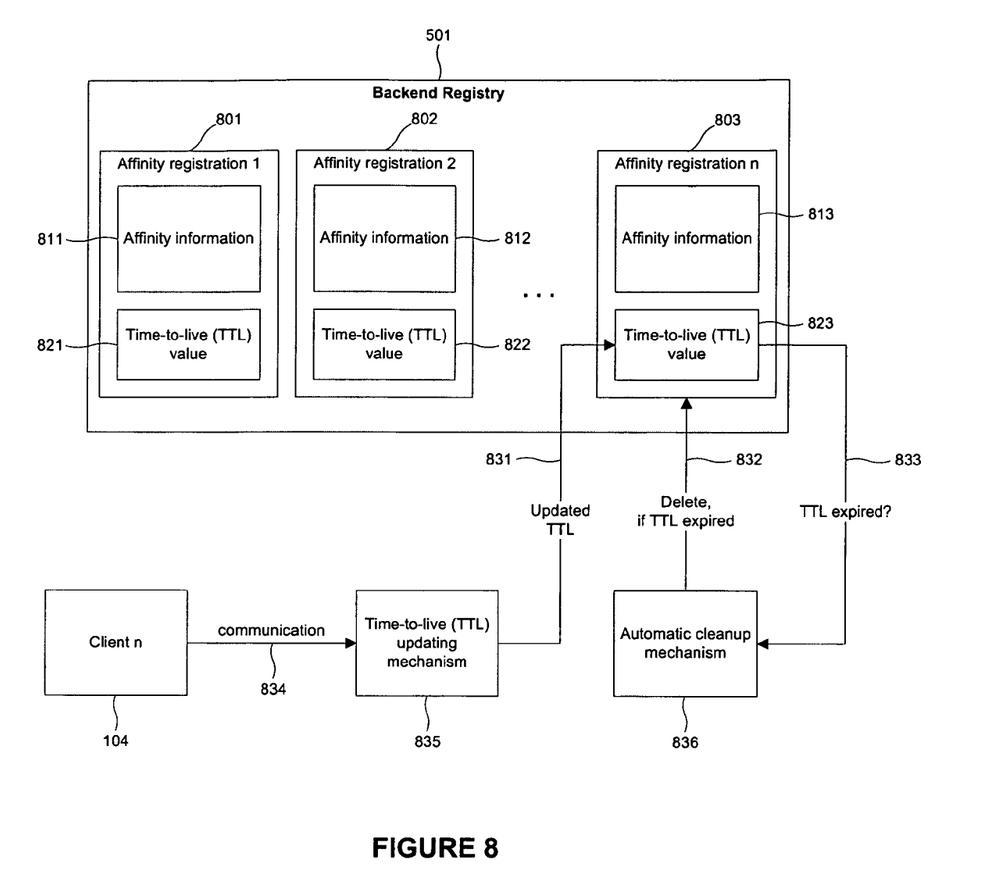
FIG. 8 is a block diagram showing an automatic cleanup mechanism for cleaning the backend registry in accordance with one embodiment of the present invention.

FIG. 8 shows a block diagram of the backend registry's automatic cleanup mechanism. In the exemplary embodiment, the backend registry 501 is represented as a memory area capable of storing a number of affinity registrations 801-803. Each affinity registration is a data structure containing affinity information sections 811-813 and each having an associated time-to-live (TTL) value 821-823. Information stored in the affinity information sections 811-813 can include addresses of clients and their elected servers, along with other identifying information. The TTL values 821-823 can be stored as integer values, which can be decremented upon the occurrence of a transaction, a lapse of time, or some other event. A TTL value can also be stored as a representation of a specific time, after which the TTL is considered to be expired.

The time-to-live (TTL) updating mechanism 835 is a module that is configured to detect a communication 834 from the client 104. When such a communication has been detected, for instance from client n 104, the TTL updating mechanism 835 determines and stores an updated TTL 831 in the TTL value 823 of affinity registration n 803 associated with client n 104. The TTL updating mechanism 835 can be configured to similarly detect communications from other clients in the network and update the TTL values of their associated affinity registrations.

The automatic cleanup mechanism 836 monitors the TTL values of affinity registrations stored in the backend registry 501 and removes affinity registrations having TTL values that are expired. The automatic cleanup mechanism 836 is configured to receive notice 833 that a particular TTL value, for example TTL value 823, is expired. Automatic cleanup mechanism 836 then deletes the affinity registration 803 associated with the expired TTL value 823.

The embodiments described above are merely illustrative of the principles of the invention. It will be apparent to one who is skilled in the art that many other variations and modifications can be made to the above-described methods and systems for management of client-server affinity without departing from the spirit and scope of the invention. The scope of the invention is therefore to be interpreted in accord with the limits set forth by the appended claims.

What is claimed is:

1. A method, comprising:
a receiving sever receiving a request from a client to establish affinity between the client and a server;
in response to said receiving the request from the client, the receiving server determining that there exists a reachable elected server that has a previously-established affinity relationship with said client;
in response to said determining that there exists a reachable elected server that has a previously-established affinity relationship with the client, redirecting said client to said reachable elected server that has a previously-established affinity relationship with the client;
the receiving server receiving a request from an other client to establish affinity between the other client and a server;
in response to said receiving the request from the other client, the receiving server determining that there does not exist any reachable elected server that has a previously-established affinity relationship with the other client;
in response to said determining that there does not exist any reachable elected server that has a previously-established affinity relationship with the other client, establishing affinity between said receiving server and said other client.

2. The method of claim 1, wherein said redirecting comprises sending said client a redirect message instructing said client to contact said reachable elected server that has a previously-established affinity relationship with the first client.

3. The method of claim 1, further comprising returning affinity information to said client and to the other client.

4. The method of claim 1, further comprising providing a backend registry.

5. The method of claim 4, wherein said determining that there exists a reachable elected server that has a previously-established affinity relationship with the client and said determining that there does not exist any reachable elected server that has a previously-established affinity relationship with the other client comprise checking said backend registry.

6. The method of claim 4, further comprising recording an affinity registration in said backend registry.

7. The method of claim 6, wherein said affinity registration is associated with a time-to-live value.

8. The method of claim 7, further comprising updating said time-to-live value when a communication is received from said other client.

9. The method of claim 7, further comprising deleting said affinity registration based on said time-to-live value.

10. The method of claim 1, further comprising breaking respective affinity when said client or said other client experiences a timeout.

11. The method of claim 1, further comprising providing a respective mailbox for each of the client and the other client.

12. The method of claim 11, further comprising allowing each of said client and said other client to poll its respective mailbox.

13. The method of claim 1, further comprising, after establishing affinity between said receiving server and said other client:
detecting that said reachable elected server exists; and
in response to said detecting, said receiving server retrieving from said reachable elected server queued messages intended for receipt by said other client.

14. A system, comprising one or more computers configured to implement:
a receiving server comprising:
a request receiving module configured for receiving requests to establish affinity between a client and a server;
an affinity determining module configured for determining whether there exists a reachable elected server that has a previously-established affinity relationship with said client;
a redirection module configured for redirecting said client when said reachable elected server exists;
an affinity establishing module configured for establishing said affinity between said client and said receiving server when said reachable elected server has been determined not to exist.

15. The system of claim 14, wherein redirecting said client comprises sending said client a redirect message instructing said client to contact said elected server.

16. The system of claim 14, further comprising a backend registry configured for storing at least one affinity registration.

17. The system of claim 16, wherein determining existence of said elected server comprises checking the backend registry.

18. The system of claim 16, further comprising a backend registration mechanism.

19. The system of claim 18, wherein said backend registration mechanism is configured for recording said affinity registration in said backend registry.

20. The system of claim 18, wherein after said affinity establishing module establishes affinity between said receiving server and said client, if said elected server exists and becomes reachable, said backend registration mechanism is configured for moving one or more messages from said elected server to said receiving server.

21. The system of claim 16, further comprising a time-to-live value associated with said affinity registration.

22. The system of claim 21, further comprising an automatic cleanup mechanism configured for deleting said affinity registration based on said time-to-live value associated with said affinity registration.

23. The system of claim 21, further comprising a time-to-live updating mechanism configured for updating said time-to-live value when a communication is received from said client.

24. The system of claim 14, further comprising a mailbox configured for storing messages.

25. The system of claim 24, wherein said mailbox is configured to allow polling of said mailbox by said client.

26. The system of claim 14, further comprising an affinity canceling mechanism configured for canceling affinity when said client experiences a timeout.

27. A non-transitory machine-readable medium having stored thereon information representing a set of machine-executable instructions that, when executed by a machine, cause the machine to implement:
a receiving server configured to perform:
receiving a request from a client to establish affinity between the client and a server;
in response to said receiving, determining whether there exists a reachable elected server that has a previously-established affinity relationship with said client;
in response to determining that the reachable elected server exists, redirecting said client to said reachable elected server; and
in response to determining that the reachable elected server does not exist, establishing affinity between said receiving server and said client.

28. A non-transitory machine readable medium as described in claim 27, wherein redirecting said client to said elected server comprises sending said client a redirect message instructing said client to contact said elected server.

29. A non-transitory machine readable medium as described in claim 27, wherein said method further comprises returning affinity information to said client.

30. A non-transitory machine readable medium as described in claim 27, wherein said method further comprises providing a backend registry.

31. A non-transitory machine readable medium as described in claim 30, wherein determining existence of said elected server for said client comprises checking said backend registry.

32. A non-transitory machine readable medium as described in claim 30, wherein said method further comprises recording an affinity registration in said backend registry.

33. A non-transitory machine readable medium as described in claim 32, wherein said affinity registration is associated with a time-to-live value.

34. A non-transitory machine readable medium as described in claim 33, wherein said method further comprises updating said time-to-live value when a communication is received from said client.

35. A non-transitory machine readable medium as described in claim 33, wherein said method further comprises deleting said affinity registration based on said time-to-live value.

36. A non-transitory machine readable medium as described in claim 27, wherein said method further comprises breaking affinity when said client experiences a timeout.

37. A non-transitory machine readable medium as described in claim 27, wherein said method further comprises providing a mailbox.

38. A non-transitory machine readable medium as described in claim 37, wherein said method further comprises allowing said client to poll said mailbox.

39. A non-transitory machine readable medium as described in claim 27, wherein said method further comprises, after establishing affinity between said receiving server and said client, if said elected server exists and becomes reachable, said receiving server retrieving from said elected server queued messages intended for receipt by said client.

* * * * *